April 15, 1969 G. T. KRAEMER 3,439,191

TIMING CIRCUIT

Filed Dec. 28, 1965 Sheet 1 of 3

INVENTOR
G. T. KRAEMER
BY E. J. Olinder
ATTORNEY

United States Patent Office 3,439,191
Patented Apr. 15, 1969

3,439,191

TIMING CIRCUIT

George T. Kraemer, Warren Township, Somerset County, N.J., assignor to Bell Telephone Laboratories, Incorporated, New York, N.Y., a corporation of New York Filed Dec. 28, 1965, Ser. No. 516,866
Int. Cl. H03k *17/26, 17/28*
U.S. Cl. 307—293 5 Claims

ABSTRACT OF THE DISCLOSURE

A timing circuit for introducing a time delay between an input signal and an output signal therefrom, utilizes a Zener diode to make the timing interval independent of variations in the voltage level of the power source. Further, the characteristics of the particular Zener diode control the duration of the timing interval.

This invention relates to signal translation circuits and in particular to circuits that generate an output signal having a preselected relation to an input signal in terms of inception time, termination time and magnitude.

The function of timing is a key aspect of virtually every major category of electronic circuitry in the field of communications. In some arrangements the timing function is performed with circuits that produce voltages that vary with time in a known fashion so that the time interval required to arrive at a preassigned voltage may be accurately predicted. For example, timing circuits frequently employ the unique delay properties of resistor-capacitor combinations or resistor-inductor combinations, commonly known as R–C circuits and R–L circuits.

In some known arrangements the timing function is performed in terms of introducing a time delay of a preselected interval between the application of an input signal and the development of an output signal. In other instances there may additionally be a requirement for an output signal having a preselected time relation to an input signal in terms of duration. Such requirements are found, for example, in multifrequency signal receivers of the type disclosed in Patent No. 3,128,349, issued to F. T. Boesch, D. H. Nash and L. Schenker on Apr. 7, 1964.

Despite the current highly developed state of the art dealing with timing arrangements of the type indicated, the rapid advance of communications technology has created additional rigid demands that have not been fully met heretofore. These demands relate to timing accuracy, isolation of the timing function from associated input and output signals, versatility with respect to timing ranges and the effect of power supply variations as a factor in the establishment of a timing interval.

One object of this invention is to enhance the accuracy of timing circuits without resort to complex auxiliary circuits.

Another object is to isolate the timing function of a timing circuit from associated input and amplified output signals.

A further object is to eliminate variations in the level of a power supply as a factor in the duration of a timing interval established by a timing circuit without resort to voltage stabilizing circuits.

An additional object of the invention is to increase the timing interval established by an R–C timing circuit by the selection of the magnitude and characteristics of circuit elements other than the basic resistive and capacitive elements of the timing circuit.

These and other objects are achieved in accordance with the principles of the invention in one illustrative embodiment wherein an R–C timing circuit is combined in circuit relation with a transistor input or buffer stage, a transistor switch, a transistor output control stage and a transistor amplifier output stage. In accordance with the invention, a first Zener diode is interposed between the timing circuit and the base electrode of the transistor switch. A second Zener diode is connected between a power supply and the emitter electrode of the transistor switch. The timing interval established between the inception of an input signal to the buffer stage and the inception of an output signal from the switch is completely independent of any variations that may occur in the level of the supply voltage and, further, the duration of the timing interval can be extended substantially by selecting Zener diodes of relatively high breakdown voltage characteristics. Consequently, a relatively long timing interval can be established in accordance with the principles of the invention without resorting to unduly large capacitors.

In accordance with one aspect of the invention, the emitter electrodes of the input or buffer stage transistor, the output control stage transistor and the output amplifier transistor are biased through a single pair of varistors. This arrangement ensures the elimination of the effect of any leakage current, and also ensures proper sequencing in the operation of these transistors between their conducting and nonconducting states.

Accordingly, one feature of the invention pertains to an R–C timing circuit uniquely interconnected with a pair of Zener diodes and a transistor switch wherein the time interval occurring between the inception of an input signal and the operation of the switch is made independent of variations in the level of the power supply.

A further feature relates to a transistor switch interconnected with an R–C timing circuit and a pair of Zener diodes to the end that the timing constant established thereby is made independent of the level of the power supply and, additionally, the magnitude of the timing constant is readily varied by a suitable selection of the Zener diode characteristics.

Another feature concerns a circuit for interposing a delay between the application of an input signal and the generation of an amplified output signal wherein an input buffer transistor, an amplifier control transistor and an output transistor are all uniquely interconnected through a common varistor biasing circuit, and wherein the magnitude of the time delay introduced by an R-C circuit in combination with a pair of Zener diodes is immune to variations in the power supply.

An additional feature involves a combination signal time delay and amplifying circuit including a buffer input transistor, a timing switch transistor, an output control transistor and an output amplifying transistor wherein an R-C timing circuit, uniquely interconnected with a pair of Zener diodes, is interposed between the buffer input transistor and the output control transistor.

The principles of the invention as well as additional objects and features thereof will be fully apprehended from the following detailed description of an illustrative embodiment and from the appended drawing in which.

CIRCUIT DESCRIPTION

Figure 1:
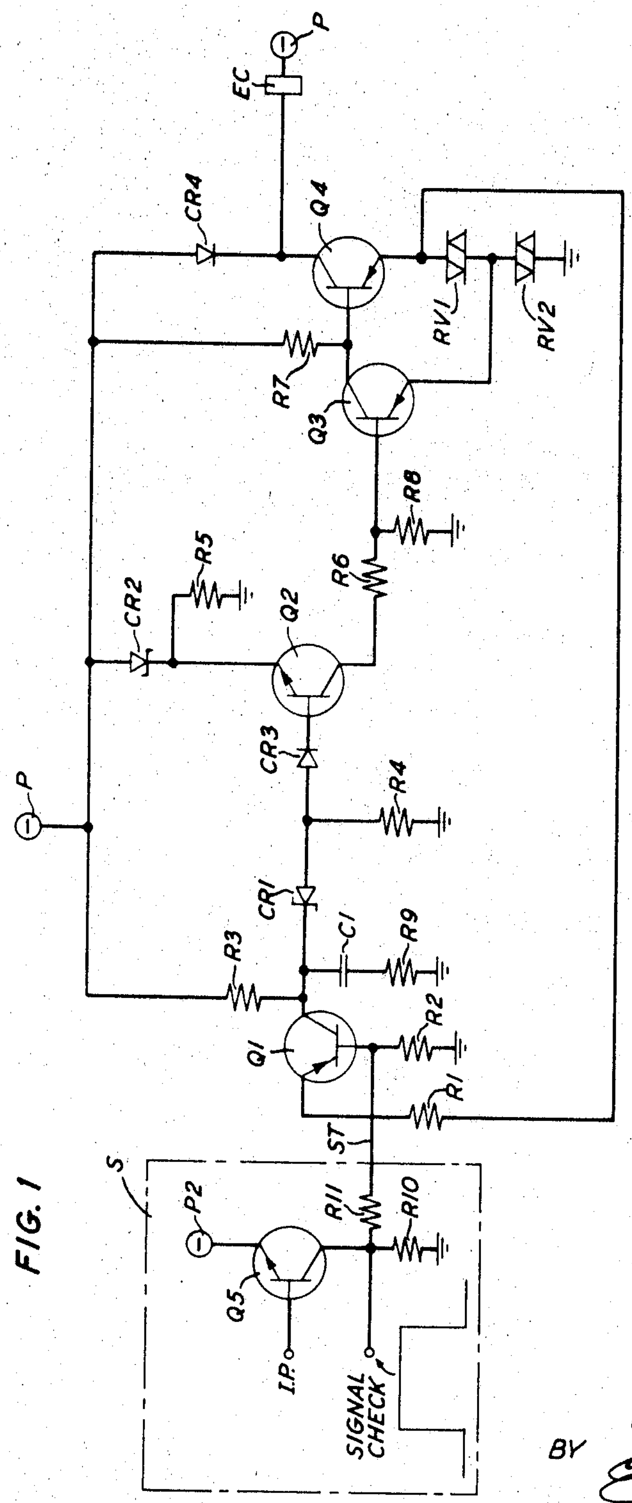
FIG. 1 is a schematic circuit diagram of a timing circuit in accordance with the invention.

In FIG. 1 a schematically indicated signal source S comprises a transistor Q5 with a power source P2 connected to the emitter thereof. The output of transistor Q5 is developed across resistor R10. Input signals from a source, not shown, are applied to the base of transistor Q5 by way of an input point IP to cause transistor Q5 to turn off.

The collector output of transistor Q5, termed a signal check, is applied by way of resistor R11 to the base of a buffer stage transistor Q1. Resistors R1, R2 and R3 fix the biasing levels for transistor Q1. A biasing voltage, such as −48 volts for example, is applied to the collector of transistor Q1 from source P by way of resistor R3. Resistor R3 and capacitor C1 together with resistor R9 provide the R-C delay characteristics for the timing function. The junction point of resistor R3 and capacitor C1 is connected to the base of a switching transistor Q2 by way of a Zener diode CR1 and a conventional oppositely poled protective diode CR3. The common terminals of Zener diode CR1 and diode CR3 are connected to ground through a resistor R4. The biasing current from the source P is supplied to the emitter of transistor Q2 by way of a second Zener diode CR2. The emitter of transistor Q2 is also connected to ground by way of resistor R5.

The output of transistor Q2 is supplied to the base of a first amplifying or control transistor Q3 by way of resistor R6. The base of transistor Q3 is also connected to ground through a resistor R8 and the collector thereof is connected to power source P through resistor R7.

The collector of transistor Q3 is connected directly to the base of a final amplifying or output transistor Q4. The power source P is extended to the collector of transistor Q4 by means of a diode CR4. The emitter of transistor Q4 is extended to ground by way of a first and a second varistor RV1 and RV2. The emitters of transistors Q1 and Q4 are connected through the resistor R1 and the emitter of transistor Q3 is connected to the junction of varistors RV1 and RV2. A conducting path extends from the collector of transistor Q4 to a suitable utilization device such as relay EC.

CIRCUIT OPERATION

Prior to the commencement of an operating cycle, transistor Q5 is on with its collector held at a negative voltage, such as −12.4 volts, assuming that source P2 provides −13 volts. This negative potential applied to the base of the buffer transistor Q1 maintains that transistor in a conducting state. The collector current of transistor Q1 flows to power source P by way of a first path that includes the resistor R3 and by way of a second path that includes Zener diode CR1, which at this point is operating in its Zener or breakdown region, forward biased diode CR3, the base to emitter junction of transistor Q2 and thence through Zener diode CR2, also operating in the Zener region. Current also flows through resistor R4 into the base of transistor Q2 by way of diode CR3. The potential at the collector of transistor Q1 is that of power source P (−48 volts) plus the sum of the Zener drops of diodes CR1 and CR2 plus the sum of the forward drops of diode CR3 and the base-emitter junction of transistor Q2. A typical magnitude of this potential may be on the order of −12 volts.

At this point transistor Q2 is conducting and its collector current is primarily the base current of transistor Q3. Transistor Q3 is saturated and has a relatively low emitter to collector drop. Consequently, almost the full potential drop across varistor RV1 is applied between the emitter and base of transistor Q4. This potential drop places a reverse bias on the emitter-base junction of transistor Q4. No current flows in the collector circuit of transistor Q4 and relay EC remains unoperated.

Figure 2:
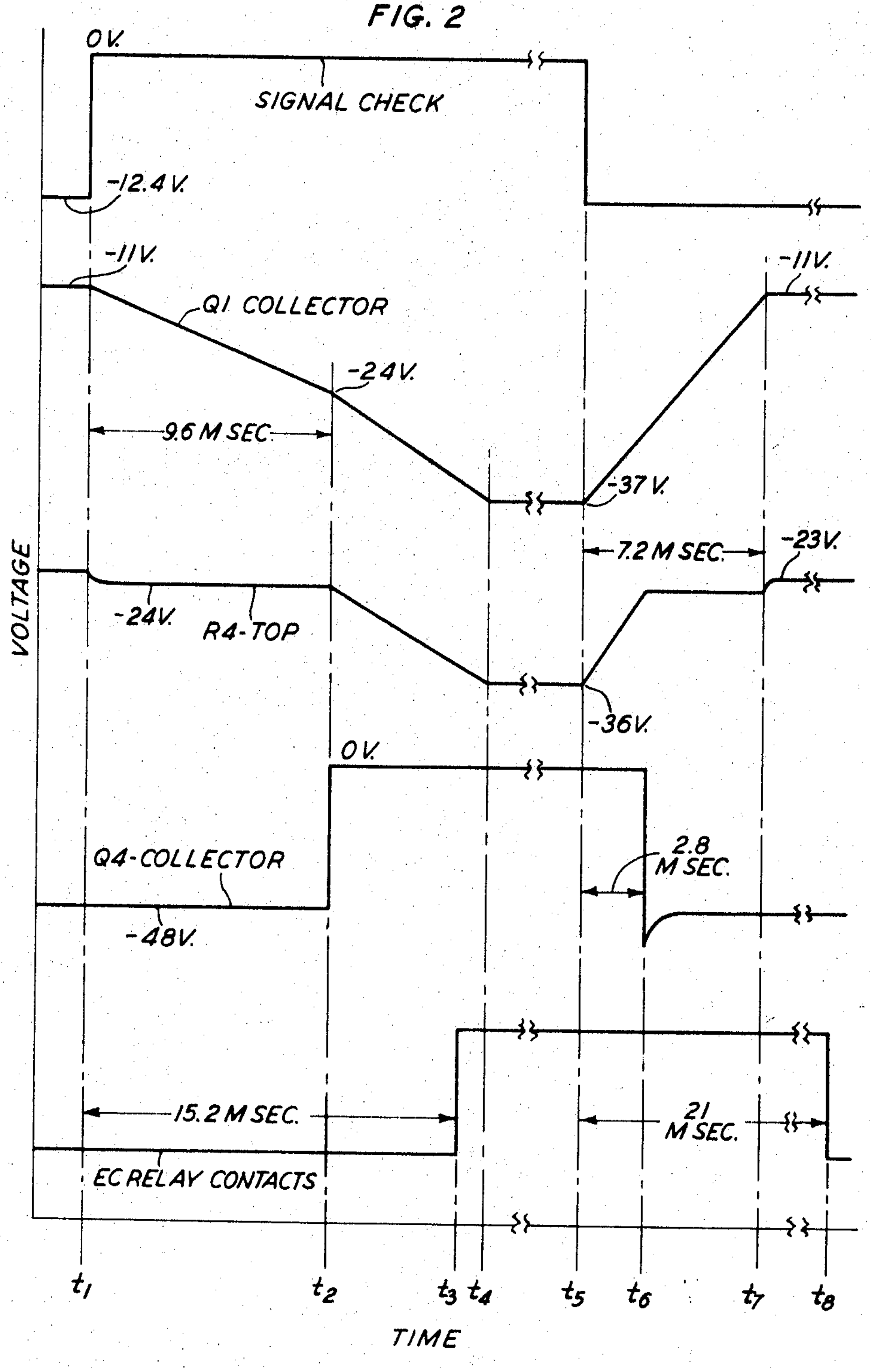
FIG. 2 is a set of waveforms indicating the signal voltage levels that occur at various indicated key points in the circuit shown in FIG. 1.

At the inception of an input signal at input point IP the voltage level is raised abruptly to approximately zero volts, as shown by the first waveform of FIG. 2, and transistor Q5 is turned off. Base drive is no longer supplied to transistor Q1 and consequently transistor Q1 becomes nonconducting. Transistor Q1 is maintained in its off condition by the reverse bias developed on varistors RV1 and RV2. Without the collector current of transistor Q1, the Zener drop of diode CR1 cannot be sustained and diode CR1 becomes an open circuit. Capacitor C1 begins to charge toward the −48 volt level supplied by source P through resistor R3. The conducting states of transistors Q2, Q3 and Q4 remain unchanged inasmuch as transistor Q2 is held on by the base current supplied entirely through resistor R4.

As capacitor C1 charges toward −48 volts, the potential on the cathode of Zener diode CR1 becomes increasingly negative and approaches its anode potential. The potential on the cathode eventually becomes sufficiently negative so that Zener diode CR1 becomes forward biased, at time $t_2$ as shown in FIG. 2, and the current through resistor R4 is thus diverted away from the base of transistor Q2 and transistor Q2 turns off. The path supplying base current for transistor Q3 is thus opened and transistor Q3 turns off and is held off by the potential drop across varistor RV2. With transistor Q3 turned off, the reverse bias on transistor Q4 is removed and it conducts at time $t_2$ as shown in FIG. 2, operating relay EC at time $t_3$.

By straightforward circuit analysis it can be shown that the time delay T between the inception of the input signal occurring at time $t_1$, as shown in FIG. 2, and the turn-on of transistor Q4, occurring at time $t_2$, as shown in FIG. 2, may be expressed as follows:

$$T = R_3 C \ln \frac{V_1 + V_2 + V_a}{V_2 + V_b}$$

where:

$V_1$ is the Zener drop of diode CR1,
$V_2$ is the Zener drop of diode CR2,
$V_a$ is the sum of the forward drop of diode CR3 and the base to emitter drop of transistor Q2, and
$V_b$ is the voltage drop across diode CR3 and the base to emitter diode of transistor Q2 at the time when transistor Q2 turns off.

As indicated in the expression above, and in accordance with the principles of the invention, the duration of timing period T is independent of the particular level of the power supply P, which, as indicated, may be on the order of −48 volts, inasmuch as Zener diode CR2 is connected between the emitter of transistor Q2 and source P rather than between the emitter and ground. Diode CR2 performs a second function in accordance with the invention in that it reduces the collector to emitter voltage of transistor Q2 during the time that this transistor is turned off. As a result, collector to emitter breakdown of transistor Q2 may be avoided even though a transistor of relatively low breakdown voltage is used. If, however, a transistor with a higher breakdown voltage is used, the magnitude of $V_2$ can be reduced and additional delay achieved for a given RC product.

After Zener diode CR1 becomes forward biased, which occurs at time $t_2$, as shown in FIG. 2, capacitor C1 continues to charge negatively to a potential less than −48 volts, −37 volts for example, which is determined by the voltage divider comprising resistors R3 and R4. Transistor Q2 becomes increasingly reverse biased in that its emitter voltage is fixed by the Zener drop on diode CR2. Diode CR3 serves a conventional protective function in that it prevents an emitter to base breakdown of reverse biased transistor Q2.

Upon the termination of the input signal at time $t_5$ transistor Q1 turns on and, acting as a constant current generator, supplies current to make the voltage at the upper terminal of capacitor C1 less negative. Diode CR1 remains forward biased and as shown in FIG. 2, the voltage across resistor R4 follows the capacitor voltage as it becomes less negative. Eventually, the voltage on resistor R4 reaches the threshold level of transistor Q2 and it turns on.

Figure 3A:
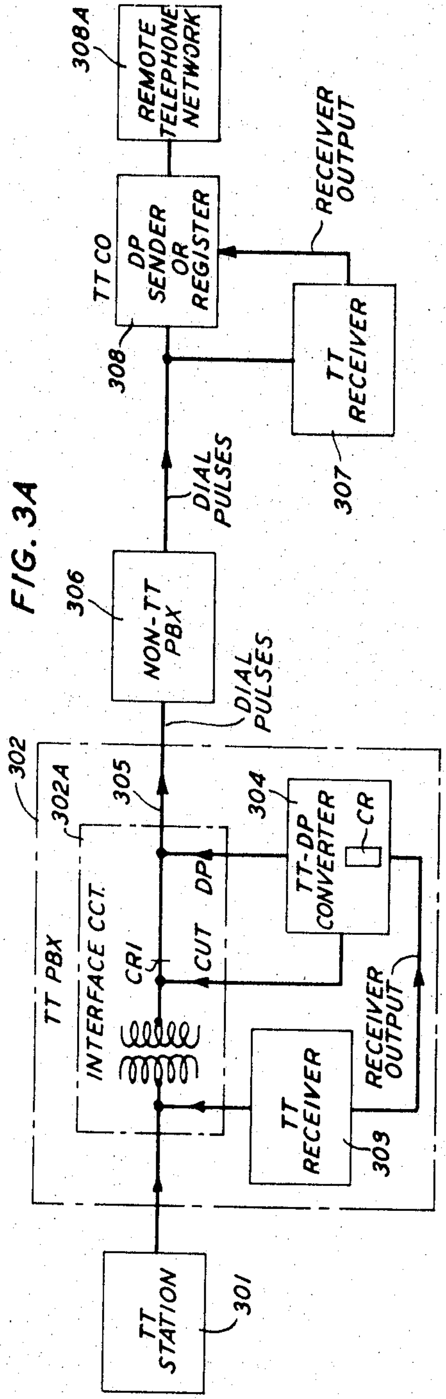
FIG. 3A is a block diagram of a multifrequency signaling system.
Figure 3B:
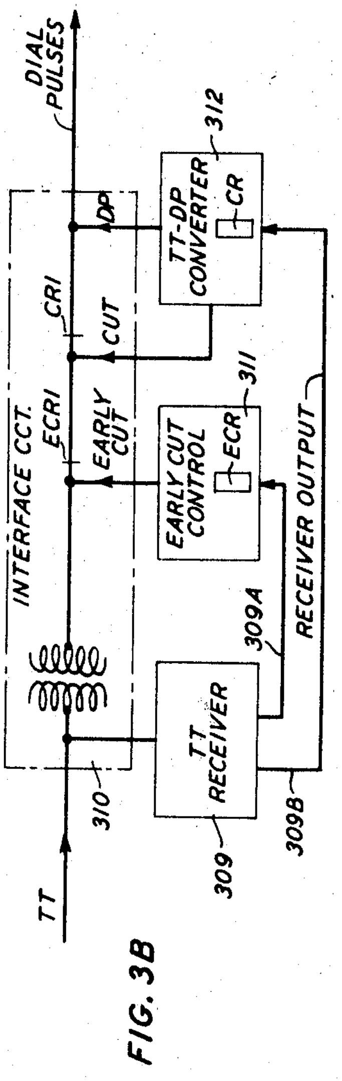
FIG. 3B is a block diagram of the system shown in FIG. 3A utilizing a timing circuit in accordance with the invention.

A specific utilization of a timing circuit in accordance with the principles of the invention is illustrated by the block diagram of a multifrequency signaling telephone system shown in FIG. 3B. The problem solved by the system shown in FIG. 3B may best be explained in terms of the block diagram of a multifrequency signaling telephone system shown in FIG. 3A which does not include a timing or control circuit in accordance with the invention. In the system shown in FIG. 3A, the primary signaling and switching units include a first multifrequency or TOUCH-TONE signaling station 301, which may be a conventional TOUCH-TONE telephone subset for example, a PBX 302 equipped for TOUCH-TONE calling, a PBX 306 not equipped for TOUCH-TONE calling or receiving, a central office 308 equipped for TOUCH-TONE signaling and a remote telephone network 308A.

When a station such as the subset 301 is sending TOUCH-TONE signals to a selected TOUCH-TONE receiver, it is essential to have the selected TOUCH-TONE receiver be the only station along the transmission path that responds to the signals. Assume for example that station 301 is making a call through the nonTOUCH-TONE calling PBX 306, through central office 308 and thence to some distant station, not shown, which is located in the remote telephone network 308A. PBX 302 includes an interface circuit 302A, a TOUCH-TONE receiver 303, and a TOUCH-TONE to dial pulse converter 304. Converter 304 includes a so-called "cut" relay CR with a break contact CR1 in the transmission line. In response to the output of receiver 303, converter 304, by means of cut relay CR and its associated break contact CR1, breaks the transmission path back toward station 301 during the time the converter is sending dial pulses forward to central office 308 by way of PBX 306. Reflection of the transmitted signals back to the transmitting station is thus avoided. Multifrequency receiver 307, associated with central office 308, should perform no function during a call of the type outlined above in view of the fact that only conventional dial pulses rather than TOUCH-TONE or multifrequency signals should reach central office 308. Under the circumstances described, however, unintended operation of receiver 307 could occur from its exposure to the TOUCH-TONE signals originating at station 301. It is accordingly desirable that means be provided to prevent the TOUCH-TONE signals from going beyond the receiver for which they are intended.

As discussed by Boesch, Nash and Schenker in the patent cited above, one form of multifrequency signal receiver interposes a delay, which may be on the order of 20 milliseconds for example, between the time that the presence of a TOUCH-TONE signal is recognized and the time an output is delivered to effect the operation of the associated telephone switching system. In the system shown in FIG. 3B an output, termed a signal check, is applied to an early cut control circuit 311 from receiver 309 by way of conducting path 309A as soon as the presence of a TOUCH-TONE signal is recognized. The application of the normal signal output to lead 309B and thence to converter 312 is delayed in the manner taught by Boesch, Nash and Schenker.

Early cut control circuit 311, which includes relay ECR and its associated break contact ECR1, advantageously comprises a timing circuit in accordance with the invention as shown in FIG. 1. By this arrangement, after a nominal delay following the inception of the signal check resulting from the TOUCH-TONE signal generation by station 301, which delay provides a measure of protection against digit simulation by speech, the early cut control circuit 311 opens the transmission path at contact ECR1 and holds it open so long as the TOUCH-TONE signal persists. As a result, the TOUCH-TONE signal at receiver 307 is terminated before receiver 307 can respond to it. As in the system shown in FIG. 3A, contact CR1 operates as soon as a TOUCH-TONE digit is stored in the converter 312 and remains operated until the final signal pulse has been transmitted, thus blocking the return of dial pulses to the transmitting station even though relay ECR and its associated break contact ECR1 have released upon the termination of the actual TOUCH-TONE signal generation.

It is to be understood that the embodiment disclosed herein is merely illustrative of the principles of the invention. Various modifications may be made thereto by persons skilled in the art without departing from the spirit and scope of the invention.

I claim:

1. Circuit means for introducing a time delay between the receipt of an input signal and the generation of an output signal comprising, in combination, a buffer transistor having base, collector and emitter electrodes, means connecting said collector electrode of said buffer transistor to an input point, means connecting said base electrode of said buffer transistor to an initial input terminal, a biasing circuit, means connecting said emitter electrode of said buffer transistor to said biasing circuit, means including a resistive element and a capacitive element in series relation connected between a source potential and a reference potential, said input point being common to one terminal of each of said elements, switch means including an input terminal, an output terminal, and a control terminal, a first Zener diode device connected between said input point and said input terminal, and a second Zener diode device connected between said control terminal and said source, whereby the time interval occurring between the application of an input signal to said initial input terminal and the occurrence of an output signal at said output terminal that follows the operation of said switch means is determined in part by the Zener voltage of said diodes and is independent of the particular magnitude of the voltage of said source.

2. Apparatus in accordance with claim 1 including first and second output transistors each having respective base, emitter and collector electrodes, means connecting said output terminal of said switch means to the base of said first output transistor, means connecting the collector of said first output transistor to the base of said second output transistor, a utilization device connected to the collector of said second output transistor, and means connecting the emitter electrodes of said output transistor to said biasing circuit.

3. Apparatus in accordance with claim 2 wherein said biasing circuit comprises first and second varistors connected between said reference potential and said emitter electrode of said second output transistor, said emitter electrode of said first output transistor being connected to a terminal common to said varistors, said means connecting said emitter electrode of said buffer transistor to said biasing circuit being connected directly to said emitter electrode of said second output transistor.

4. Apparatus responsive to an input signal for generating an output signal having an inception a preselected interval of time after the inception of said input signal and having a termination a preselected time after the termination of said input signal, comprising, in combination, a resistive element and a capacitive element connected between a source of potential and a reference potential, a transistor switch having base, emitter and collector electrodes, an input point common to one terminal of each of said elements, means including a first Zener diode connected between said input point and said base electrode, a second Zener diode connected between said emitter electrode and said source, a resistive element connected between said reference potential and a terminal of said Zener diode, means for amplifying signals developed on said collector electrode, and utilization means connected to the output of said amplifying means.

5. Apparatus in accordance with claim 4 including an initial input terminal, a buffer transistor connected between said input terminal and said input point, the collector of said buffer transistor being connected to said input point, the base of said buffer transistor being connected to said input terminal, said amplifying means including first and second amplifying transistors, a common biasing circuit for said buffer transistor and for said first and second amplifying transistors including a pair of varistors in series relation connected between said reference potential and the emitter electrode of said second amplifying transistor, means connecting the emitter electrode of said first amplifying transistor to the junction point of said varistors, and means connecting the emitters of said buffer transistor and of said second amplifying transistor.

References Cited

UNITED STATES PATENTS

| | | | |
|---|---|---|---|
| 3,131,318 | 4/1964 | Snyder et al. | 307—293 |
| 3,200,258 | 8/1965 | Carroll | 307—293 |
| 3,202,937 | 8/1965 | Anderson | 307—318 |

ARTHUR GAUSS, *Primary Examiner.*

B. P. DAVIS, *Assistant Examiner.*

U.S. Cl. X.R.

307—318; 317—148.5